US008871891B2

(12) United States Patent
Barker (10) Patent No.: US 8,871,891 B2
(45) Date of Patent: Oct. 28, 2014

(54) TWO PART POLYUREA-URETHANE ADHESIVE WITH ELEVATED HIGH TEMPERATURE STORAGE MODULUS

(75) Inventor: Michael James Barker, Powell, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 13/471,511

(22) Filed: May 15, 2012

(65) Prior Publication Data

US 2012/0295104 A1 Nov. 22, 2012

Related U.S. Application Data

(60) Provisional application No. 61/486,512, filed on May 16, 2011.

(51) Int. Cl.
| C08G 18/32 | (2006.01) |
| C08G 18/40 | (2006.01) |
| C08G 18/48 | (2006.01) |
| C08G 18/72 | (2006.01) |
| C09J 175/02 | (2006.01) |

(52) U.S. Cl.
USPC .......... 528/64; 528/60; 528/63; 528/65; 528/66; 528/905; 156/331.4; 156/331.7

(58) Field of Classification Search
USPC ......... 528/60, 63, 64, 65, 66, 905; 156/331.4, 156/331.7
See application file for complete search history.

(56) References Cited

U.S. PATENT DOCUMENTS

| 7,307,136 B2 * | 12/2007 | Bleys et al. ............... 528/67 |
| 8,410,213 B2 * | 4/2013 | Barker et al. ............ 524/590 |
| 2009/0044907 A1 | 2/2009 | Tribelhorn et al. |
| 2010/0068530 A1 | 3/2010 | Laubry |

OTHER PUBLICATIONS

Written opinion of the International Search Authority dated Aug. 10, 2012.

* cited by examiner

*Primary Examiner* — Rabon Sergent
(74) *Attorney, Agent, or Firm* — Mark A. Montana (57) ABSTRACT

Two-part polyurea-urethane adhesive compositions comprising a Part A prepolymer component having an isocyanate component comprising polymeric isocyanate and an oligomer content greater than 15 weight percent, polyol having a molecular weight of about 5,000 to about 12,000 and about 20 weight percent to about 44 percent weight percent filler; and a Part B curative component comprising polyol having molecular weight of about 5,000 to about 12,000, aromatic amine, about 20 weight percent to about 44 percent weight percent filler and catalyst wherein the adhesive has an 85° C. storage modulus greater than about 20 MPa. The two-part polyurea-urethane adhesive composition can be applied to bond various substrates including composite materials and metal, including making parts for the transportation and assembly markets.

24 Claims, 1 Drawing Sheet

TWO PART POLYUREA-URETHANE ADHESIVE WITH ELEVATED HIGH TEMPERATURE STORAGE MODULUS

CROSS-REFERENCE TO RELATED APPLICATIONS

This application claims the benefit of U.S. Patent Application No. 61/486,512 filed May 16, 2011. U.S. Patent Application No. 61/486,512 is incorporated herein in its entirety by reference.

BACKGROUND OF THE INVENTION

1. Field of the Invention

The invention pertains to a two-part polyurea-urethane adhesive composition wherein the Part A prepolymer component comprises hydroxyl compounds, isocyanates and filler materials, and the Part B curative component comprises hydroxyl compounds, amine compounds and filler materials. The two-part polyurea-urethane adhesive is applied in processes for bonding engineered structures.

2. The Related Art

Two part polyurethane adhesives are used extensively in the transportation and assembly markets for bonding various composite and metallic components. They have found significant advantage over mechanical fasteners due to their ability to transfer loads over broad ranges of the bond line which in most applications translates to extended fatigue life.

A disadvantage associated with a polymeric adhesive in certain applications, particularly in the transportation and assembly markets, is that the modulus or stiffness changes across the in-service temperature range from −35° C. to 85° C. The polymer may become overly hard and brittle at sub ambient temperatures and overly soft at elevated temperature. This observation is exaggerated with a typical phase separated polyurethane adhesive that segregates to both hard and soft domains. These domains typically show up as discrete glass transition temperatures ("Tg"), one at sub-ambient temperature representing the soft phase and the other at elevated temperature representing the hard phase. The disadvantage of the two phase morphology is the stiffness of the adhesive rapidly transitions from a firm load bearing polymer to a soft leathery material as it transitions through its high temperature Tg leading to inconsistent bulk properties.

Two component polyurea-urethane adhesives are known in the art. For example, such adhesives may be obtained by the reaction of a polyol mixture, an aromatic diamine and an isocyanate terminated prepolymer to extend the open time, maintain fast reaction and create a nearly 1:1 ratio for use in fast reaction injection molding applications. Also known are polyurea-urethane adhesive based on a slow reacting uretonimine modified isocyanates, two part structural primerless urethane adhesives for bonding polyester composites comprising a curative having a mixture of low molecular weight polyether polyol with both slow reacting and fast reacting amines, a two part polyurea-urethane adhesive for bonding elastomers having a curative comprising a mixture of a polymer of di-p-aminobenzoate containing a poly(tetramethyleneglycol) backbone with molecular weight ranging from 1,000 to 2,900 and an aromatic diamine and long open time two part polyurethane adhesives comprising a diisocyanate in one part and a curative consisting of a mixture of polyols with molecular weight varying from 2,000 to 12,000 bearing secondary hydroxyls blended with either short chain secondary polyols with molecular weight ranging from 90 to 800 with functionality greater than 2 or short chain secondary polyol with a similar short chain polyol with functionality equal to 2.

It would be commercially advantageous to provide a polyurethane adhesive that would combine characteristic advantages of good strength, low sag, high tensile strength and Young's modulus, adhesion and fast cure with a single Tg product that demonstrates improved stiffness at elevated temperature. Increased elongation is also desirable, particularly with improved stiffness at elevated temperature. Adhesive having these properties would be highly desired, such as in the transportation and assembly markets for bonding various composite and metallic components.

SUMMARY OF THE INVENTION

The two-part polyurea-urethane adhesive composition comprises two parts, the Part A prepolymer component and Part B curative component. The Part A prepolymer component comprises hydroxyl compounds, isocyanates and filler materials. The Part B curative component comprises hydroxyl compounds, amines and filler materials. Both the Part A component and/or the Part B component may comprise molecular sieves. In an embodiment, the two-part adhesive comprises combinations of diols and triols in either or both of the Part A and Part B components. In embodiments, the polyurea-urethane adhesive composition and/or the Part A and/or Part B components thereof may comprise, consist essentially of or consist of the constituents disclosed herein.

Typically, the two-part polyurea-urethane adhesive is characterized by having a single Tg, an open time range of about 4 to about 10 minutes at 30° C., ability to reach full cure at ambient or elevated temperature, high strength and elongation while providing improved elevated modulus or stiffness at 85° C. The two-part polyurea-urethane adhesive composition has an 85° C. storage modulus greater than about 20. In particular, it has surprisingly been found that the adhesive exhibits three, three-way interactions among i) molecular weight, isocyanate content and aromatic amine; ii) molecular weight, isocyanate content and percent filler and iii) molecular weight, aromatic amine and percent filler that when combined properly will increase the modulus or stiffness of the polymer at elevated temperature.

The two-part polyurea-urethane adhesive is particularly useful to bond substrates together, for example parts for automobiles, trucks, carriages and other vehicles, although the utility of the invention is not limited thereto. In aspects of the invention, the two-part adhesive can be used to adhere two or more composite substrates together, such as composite materials comprising unsaturated polyester resin ("UPR") materials, vinyl ester resin ("VER") materials, epoxy resin materials and the like. The two-part polyurea-urethane adhesive may be used to adhere two or more metal substrates together and also one or more metal substrates with one or more composite substrates such as the UPR materials, the epoxy materials and/or VER materials discussed above. The two-part polyurea-urethane adhesive may also be used with the various engineered thermoplastics such as polypropylene, thermoplastic olefins, nylon, acrylonitrile-butadiene styrene or other engineered substrates known in the art. The adhesive may be applied with or without substrate surface treatment, such as a wipe on primer, plasma or corona surface treatment and the like.

All non-reactive component parts and percentages set forth herein are on a weight-by-weight basis of all components in the mixture, unless otherwise specified. The reactive components are cited in equivalent percent. The equivalent percent is calculated by dividing the equivalents of a reactive species by the total equivalents of all reactive species in the mixture. The equivalent weight of a polymer is its molar mass which has one equivalent of reactivity and may be calculated by dividing its molecular weight by the number of reactive sites in the polymer. The equivalent percent is a useful tool to draw attention to the relative proportion of reactive end groups used in a mixture in exclusion of the weight percents used. The molecular weight referred to in the specification is the weight average molecular weight (Mw).

DETAILED DESCRIPTION OF THE INVENTION

Typically, the Part A prepolymer component comprises polyether polyol, for example polyether triol, like secondary hydroxyl polyether triol; isocyanate, such as polymeric methylene diphenyl diisocyanate ("pMDI"); talc; fumed silica and molecular sieves. The Part B curative component contains primary hydroxyl bearing polyether polyols, such as combinations of diols and triols; amine; talc and fumed silica. A combination of primary hydroxyl ethylene oxide capped PPO polyol trial having a molecular weight of about 6,000 and 1,4,-butanediol can comprise the polyether polyol of the Part B component. Other short chain diols and triols may be used in addition to or in place of the diols and triols mentioned above. For example, the 1,4-butanediol may function as a low molecular weight chain extending compound, and other low molecular weight chain extending compounds providing similar function may be incorporated into the Part B curative component. The amine portion of the Part B component may be one or more of, or all of, piperazine, di(methylthio)-toluenediamine, triethylene diamine and diazobicycloundecene. Other amines may be used in the Part B component, in addition to or in place of those mentioned above.

In the Part A prepolymer component, the isocyanate content varies from about 82 to about 95 equivalent percent and the hydroxyl component varies from about 5 to about 18 equivalent percent. The hydroxyl component molecular weight varies from about 5,000 to about 12,000. The filler concentration in the Part A component varies from about 10 to about 50 weight percent. Persons of ordinary skill in these arts, after reading this disclosure, will appreciate that all ranges and values for the components disclosed herein are contemplated.

In the Part B curative component, the hydroxyl compounds comprise a mixture of both high and low molecular weights ranging from about 70 to about 12,000, such that the Part B component may comprise a lower molecular weight hydroxyl compound and a higher molecular weight hydroxyl compound. The low molecular weight hydroxyl compound may have a functionality of about 2 and molecular weight ranging from about 32 to about 600; the high molecular weight compound may have a functionality of about 2 to 5 and have a molecular weight ranging from about 5,000 to about 18,000. The Part B component comprises about 5 to about 28 equivalent percent polyether polyol, about 72 to about 95 equivalent percent amine and a filler concentration from about 20 to about 47 weight percent. Persons of ordinary skill in these arts, after reading this disclosure, will appreciate that all ranges and values for the components disclosed herein are contemplated.

In an aspect of the invention, the Part A component comprises about 5 equivalent percent to about 18 equivalent percent polyether polyol, about 82 equivalent percent to about 95 equivalent percent MDI, about 5 to about 36 weight percent, including about 5 to about 30 weight percent, talc, up to about 7 weight percent, including about 1 to about 7 weight percent, fumed silica and up to about 5 weight percent, including about 0.1 to about 5 weight percent molecular sieves, and the Part B component comprises about 5 to about 28 equivalent percent polyether polyol, about 72 to about 95 equivalent percent amine, about 20 to about 40 weight percent talc and up to about 7 weight percent, including about 0.1 to about 7 weight percent, fumed silica. In a particular aspect of the invention, the Part A component comprises about 7 to about 12 equivalent percent secondary hydroxyl polyether triol having a molecular weight of about 9,000 polymerized with organometallic catalyst to reduce levels of terminal unsaturation and monol content (such as L330-18 available from Arch Chemicals, Norwalk, Conn., U.S.A.), about 88 equivalent percent to about 93 equivalent percent MDI, about 5 to about 36 weight percent, including about 5 to about 20 weight percent, talc, about 0.1 to about 7 weight percent fumed silica and about 0.5 to about 5 weight percent, including about 1 to about 5 weight percent, molecular sieves (such as UOP type 5A molecular sieves), and the Part B component comprises about 7 equivalent percent to about 12 equivalent percent primary hydroxyl ethylene oxide capped PPO polyol triol having a molecular weight of about 6,000 (such as CARPOL® GP6515 available from Carpenter Co., Richmond, Va. U.S.A.), up to about 14 equivalent percent, such as about 1 equivalent percent to about 14 equivalent percent, 1,4-butanediol, up to about 19 equivalent percent, such as about 1 equivalent percent to about 19 equivalent percent, piperazine, about 57 equivalent percent to about 93 equivalent percent aromatic amine such as di(methylthio)-toluenediamine, about 0.01 to about 2 weight percent triethylene diamine (such as Crystal DABCO from Air Products & Chemicals, Inc., Allentown, Pa., U.S.A.), about 0.1 to about 2 weight percent diazobicycloundecene, about 1 to about 7 weight percent fumed silica and about 25 to about 40 weight percent talc.

Suitable polyols that may be incorporated in the Part A prepolymer component include polyalkylene oxide based polyols. Suitable polyether polyols include polyethers made by the polymerization of epoxides such as ethylene oxide, propylene oxide, butylene oxide, tetrahydrofuran, styrene oxide, epichlorohydrin and the like or combinations thereof. The polyether polyols may comprise one or more of the aforementioned materials as mixtures or in sequence and may be primary or secondary. The molecular weight of the polyols may be from about 5,000 to about 18,000, preferably from about 6,000 to about 10,000 and most preferably about 5,000 to about 12,000. Polypropyleneoxide based polyols, such as those having functionality ranging from about 2 to about 4, preferably about 3, may be used in the invention. The prepolymer component can comprise up to about 30 equivalent percent of these polyols; the preferred range is about 5 to about 18 equivalent percent.

Suitable polymeric isocyanates in the Part A prepolymer component comprise a blend of varying isomers of methylene diphenyl isocyanate with functionalities ranging from about 2 to about 10. These may be blended with monomeric isocyanates to adjust the overall ratio of monomer to oligomer and the final functionality. Typically, the isocyanate component of the prepolymer will comprise greater than about 15 weight percent oligomer content based on the weight of the isocyanate component, preferably greater than 30 weight percent by weight oligomer content based on the weight of the isocyanate component. Other isocyanates or combinations thereof may include aliphatic or aromatic, mono or difunctional blended with multifunctional molecules such that the average functionality is greater than about 2. MONDUR® MRS-4 isocyanate from Bayer Material Science, Pittsburgh, Pa., U.S.A. ("Bayer") which is polymethylene polyphenylpolyisocyanate, may be used in combination with MONDUR® ML isocyanate from Bayer which is 4,4'-methylene diphenylisocyanate. The concentration of polymeric isocyanate may range from about 50 to about 90 equivalent percent of the isocyanate functional organic component to create a blend with over 30 percent oligomer content utilized at concentrations of about 82 to about 95 equivalent percent.

Fillers suitable for use in the invention, either in the Part A prepolymer component and/or the Part B curative component, include talc, mica, kaolin, bentone clay, aluminum oxides, titanium oxides, iron oxides, barium sulfate, hornblends, amphibiles, chrysotile, carbon black, carbon fibers, fumed silica, molecular sieves and the like, and combinations thereof. Preferred filler is talc, such as MISTRON® RCS talc from Rio Tinto Minerals, London, U.K. The Part A prepolymer component may comprise up to about 50 weight percent filler, typically from about 20 to about 44 weight percent. The Part B curative component may comprise up to about 50 weight percent filler, typically from about 20 to about 44 weight percent.

Fumed silica, when used in the polyurea-urethane adhesive composition, in either the Part A prepolymer component or Part B curative component, provides thixotropic viscosity enhancement to assist in the minimization of filler settling. Hydrophilic fumed silica, hydrophobic fumed silica, and the like and combinations thereof may be used and hydrophobic fumed silica is preferred. AEROSIL® R972 fumed silica from EVONIK® Industries AG, Essen, Germany may be used. The amount of fumed silica in the Part A prepolymer component or Part B curative component may be up to about 20 weight percent, such as from about 0.5 to about 7 weight percent, of the overall composition, or of each component part of the adhesive composition.

Suitable molecular sieves are selected such that the pore opening is appropriate for the absorption of moisture. The molecular sieves may be present in the Part A prepolymer component, the Part B curative component or in both of these components. The preferred pore size is about 3 to about 5 angstroms. Type 5A molecular sieves are preferred. The molecular sieves may be present in the Part A prepolymer component, the Part B curative component or in both of these components. The amount of molecular sieves in the Part A prepolymer component or Part B curative component may be up to about 30 weight percent, such as from about 1 to about 10 weight percent in either or both parts.

Suitable polyols for the Part B curative component are typically based on and comprise polyalkylene oxide. The polyalkylene oxide generally comprise polyethers made by the polymerization of epoxides such as ethylene oxide, propylene oxide, butylene oxide, tetrahydrofuran, styrene oxide, epichlorohydrin and the like, and combinations thereof. The polyether preferably comprises ethylene oxide capped polypropylene oxide, and may consist of or consist essentially of this material. The functionality typically ranges from about 1 to about 5, with a preferred functionality of about 3. The molecular weight range of the polyol may be from about 5,000 to about 18,000, preferably in the range of about 4,000 to about 9,000 and is most preferably in the range of about 5,000 to about 6,000. The curative may comprise up to about 30 equivalent percent polyol, such as about 1 to about 30 equivalent percent, based on the total equivalents of isocyanate reactive components in the curative and preferably comprises from about 7 to about 12 equivalent percent.

The low molecular weight chain extending compounds which may be included in the Part B curative component are selected to increase the hard block domain of the segmented structure or morphology created during the final urethane reaction when parts A and B are mixed together and as a formulation tool to create whole number mix ratios. These low molecular weight chain extending compounds are hydroxyl or amine terminated, preferably hydroxyl terminated. By nature of their relative short length and polarity these compounds will function to enlarge the polar isocyanate region creating a macromolecular higher melting point region capable of acting as a pseudo cross-link in the overall system. The low molecular weight chain extending compound may have a functionality of about 2 and molecular weight ranging from about 32 to about 600. In embodiments the molecular weight of the chain extending compound is from about 70 to about 600. The concentration of low molecular weight chain extending compound may vary from about 0 to about 19 equivalent percent based on the total equivalents of isocyanate reactive components in the curative, such as being present in amounts of about 0.1 to about 19 equivalent percent based on the total equivalents of isocyanate reactive components in the curative. The low molecular weight chain extending compound may be selected from the group consisting of ethylene glycol, 1,5-pentanediol, 1,3-pentanediol, 1,3-butanediol, 2,3-butanediol, tripropyleneglycol, ethoxylated bisphenol A, 1,2-propanediol, 1,3-propanediol, 1,4-butanediol, 1,6-hexanediol, triethylene glycol, diethylene glycol, dipropylene glycol, 2-methyl-1,3-propane diol and the like, as well as their respective chain extended homologs and combinations thereof. Preferred low molecular weight chain extending compounds include 1,4-butane diol, ethylene glycol, 1,2-propane diol, dipropylene glycol and combinations thereof.

The amine in the Part B curative component generally comprises aromatic diamines which are sterically hindered to reduce reactivity when combined with polymeric isocyanate of the Part A prepolymer component. Such aromatic amines optionally include, but are not limited to 4,4' methylene-bis-3-(chloro-2,6-diethylbenzenamine) (MCDEA); methylene-bis-ortho-chloroaniline (MBOCA); 4,4'-methylene-bis-(2-chloro-6-ethylaniline) (MCEA); 1,2-bis(2-aminophenylthio) ethane and dimethylthiotoluenediamine (DMTDA). The preferred aromatic diamine is dimethylthiotoluenediamine as a mixture of 2,4 and 2,6 isomers.

In addition, the Part B curative component may, optionally, comprise amine to create chemical thixotropy in the blended system by immediately reacting with the isocyanate in the Part A prepolymer component to form a pseudo gel creating body to eliminate sag. The molecular weight of the chemical thixotropy creating amine may vary from about 50 to about 450 and is typically from about 80 to about 180. The chemical thixotropy creating amine may be aliphatic, cycloaliphatic or aromatic, having a functionality of about 2 or higher and should not be sterically hindered as to prevent immediate reaction with isocyanate. The preferred chemical thixotropy creating amines are those comprising primary or secondary amine groups, such as propylene diamine, butylene diamine, toluene diamine, isophorone diamine, 2-methyl-1,5-pentane diamine, diethylene triamine, pentamethylene diamine, 1-methyl-3,5-diethyl-2,6-diamino benzene, diethylene diamine, ethylenediamine, hexamethylenediamine, bis(4-aminocyclohexyl)methane, 1-amino-3,3,5-trimethyl-5-aminomethylcyclohexane, 2,4-diaminomesitylene, 1,3,5-triethyl-2,4-diaminobenzene, 1,8-diamino napthelene, piperazine and the like and combinations thereof. The preferred chemical thixotropy creating amine is piperazine. The concentration of the primary amine may be up to about 19 equivalent percent based on the isocyanate reactive components in the curative, including from about 1 to about 19 equivalent percent, such as in the range of about 0 equivalent percent to about 12 equivalent percent, like about 1 to about 12 equivalent percent, based on the isocyanate reactive components in the curative.

The Part B curative component may optionally comprise one or more catalysts. Suitable catalysts include those capable of accelerating the urethane and urea chain extension and cross-linking reaction. Typically the catalyst comprises tertiary amine such as triethylamine, benzyldimethylamine, triethylenediamine, tetramethylbutanediamine, diazobicycloundecene, and the like and combinations thereof. As an alternative to such amines or in addition to, the catalyst may comprise metal catalysts, including but not limited to stannous acetate, stannous octoate, stannous laurate, stannous oleate, dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate, trialyltin hydroxide, dialkyltin oxide, dibutylin disulfide, dibutyl tin diisooctylmaleate, dibutyltin dilauryl mercaptide, dibutyltin di(isooctylmercaptoacetate), zinc neodecanate, iron acetylacetonate, and bismuth compounds such as octoate, neodecanoate, pivalate, 2-ethylhexanoate, naphthanate and the like and combinations thereof. The concentration of the catalyst may vary based on the relative effectiveness of the catalyst selected but generally is in the range of about 0.01 to about 10 weight percent. Typically, the amount of catalyst is selected to create about a 4 to about a 10 minute open time and green strength about 4 to about 10 times the open time when evaluated at about 30° C.

The polyurea-urethane adhesive composition may further comprise optional components for functionality in either the Part A prepolymer component, Part B curative component, or both components. For example, the composition may comprise additives that improve adhesion such as propoxylated or ethoxylated dibutyl pyrophosphoric acid, acrylic phosphate esters, carboxyl functional polyester acrylates, various silane containing entities such as N,N-butyl-3-amino propyltrimethoxysilane, triethoxysilylpropyl amine, trimethoxysilylpropyl amine and the like. In addition the polyurea-urethane adhesive composition can comprise other additives including but not limited to color pigments, dyes, UV inhibitors, plasticizers, antifungal or anti bacterial agents.

The Part A and Part B components are kept separate until the two-part adhesive is used. The two-part adhesive comprises various weight and volume ratios of the Part A component and Part B component. For example, the weight ratio of the Part A:Part B components may be from about 1.25:1 to about 2.50:1 and the volume ratio of the Part A:Part B components may be from about 1:1 to about 3:1, it being understood that various other volume and weight ratios are within the scope of the invention, as one skilled in the art will appreciate, after reading this disclosure, that all ranges and values within these explicitly stated ranges are contemplated.

The polyurea-urethane adhesive composition may be applied in a process for adhering substrates, such as metal and composite materials. The process generally comprises providing the polyurea-urethane adhesive composition described herein and applying the Part A prepolymer component and Part B curative component to one or more surfaces of at least a first substrate and then placing at least one surface of a second substrate in contact with the polyurea-urethane adhesive composition and allowing the adhesive composition to cure. Substrates include composite materials comprising unsaturated polyester resin ("UPR") materials, vinyl ester resin ("VER") materials, epoxy resin materials; metals, plastic films and other plastic materials. In embodiments, the process is used to adhere composite materials together or to adhere metal to composite materials. The process can further comprise surface treatment of one or more of the surfaces that come into contact with the polyurea-urethane adhesive composition, but in embodiments no surface treatment is applied to the substrates.

The invention further encompasses parts comprising two or more pieces where the pieces are adhered together, such as a part for an automobile or other transportation vehicle, like a motorcycle, bicycle, train, boat, airplane or space vehicle. The parts comprise at least two substrates and one or more layers of the polyurea-urethane adhesive composition, which adheres the substrates to each other.

EXAMPLES

In these examples all temperatures are in degrees Celsius, all proportions are by weight unless expressly indicated otherwise and all bonding was on epoxy based carbon graphite composite, unless otherwise noted.

Mixing Part A and Part B Components

One laboratory method applied in the examples to prepare the mixture of the Part A prepolymer component and Part B curative component upon application is to measure the proper amounts of A and B components into a 200 ml cup and mix for two minutes at 2,500 RPM in a Speedmixer™ DAC 400 FVZ mix system. Alternatively, and more preferred and also applied in the examples to prepare the mixture of the Part A prepolymer component and Part B curative component upon application, is to load the A and B components individually and separately into side by side cartridges and pump through a static mix tube to achieve complete mixing.

Construction of Test Samples

Lap Shear Test

The polyurea-urethane adhesive composition is applied directly from the static mix tube or mix cup onto one side of the appropriate substrate. The lap shear test requires overlapping the last 2.5 cm of a pair of 10 by 2.5 cm coupons to create a 17.8 cm long sample with adhesive and 0.76 mm glass spacer beads between the overlap. The sample then is placed between a two sided fixture held at ambient temperature, 19 to 22° C., until solidified. Once removed from the fixture it is held at ambient temperature for 24-72 hours at which time the samples are evaluated at alternate temperatures to model practical in use applications. The lap shear test is conducted according to ASTM D3163 with a crosshead speed of 0.127 cm per minute. ASTM D3163 is incorporated herein by reference in its entirety. All adhesives were prepared at an isocyanate index in the range of 121 unless otherwise noted.

Storage Modulus

Stiffness or storage modulus and glass transition temperatures may be measured by dynamic mechanical analysis (DMA), using tension-film clamps. The samples were surface ground from both sides to achieve a final thickness of about 0.85 mm. The samples were tested in tension at 1° C./minute from −100° C. to 150° C. at a constant frequency of 1 Hz, a preload force of 0.01N, amplitude of 20 μm, and a force track of 120%. The Tg was generated via ASTM-E-1640 using the loss modulus peaks, which is incorporated herein in its entirety by reference.

Bulk Mechanical Properties

Tensile strength, Young's modulus and elongation at break were generated according to ASTM-D638, which is incorporated herein in its entirety by reference.

Preparation of Part A Prepolymer Component

The polyol and dry talc were added to a resin kettle, sealed and heated to 71° C. and mixed for 15 minutes prior to the addition of all the isocyanate and then mixed for 60 minutes to complete the reaction. To this mixture was added fumed silica and molecular sieves before mixing under vacuum of −100 kPa for 30 minutes. The final product was transferred to glass jars, purged with dry nitrogen and stored until used.

Preparation of Part B Curative Component

Polyol, short chain diol, dry talc and aromatic amine were added to a resin kettle, sealed and heated to 71° C. and mixed for 40 minutes. To this mixture was added piperazine and catalyst before mixing under vacuum of −100 kPa for 30 minutes. The final product was transferred to glass jars, purged with dry nitrogen and stored until used.

Raw Materials

The following table identifies the raw materials and sources of raw materials used in the examples.

| RAW MATERIAL USED IN THE EXAMPLES | |
|---|---|
| | Description, Manufacture |
| GP6515 | Ethylene oxide capped polypropylene oxide, triol, 6000 Mol. Wt. Carpenter Chemical |
| GP5117 | Ethylene oxide capped polypropylene oxide, triol, 5000 Mol. Wt. Carpenter Chemical |
| GP3510 | Ethylene oxide-polypropylene oxide, triol, 3000 Mol. Wt. Carpenter Chemical |
| Poly L 330-18 | Polypropylene oxide triol, 9300 Mol. Wt. Arch Chemical |
| Mondur MRS-4 | Polymeric methylene diphenyl isocyanate, eq. wt 129, Bayer Chemical |
| Mondur ML | Monomeric methylene diphenyl isocyanate, eq. wt. 125, bayer Chemical |
| Mondur M200 | Polymeric methylene diphenyl isocyanate, eq. wt 137, Bayer Chemical |
| M20 | Polymeric methylene diphenyl isocyanate, eq. wt 133, BASF Chemical |
| RCS Talc | Talc, Rio-Tinto Chemical |
| 5A Molecular Sieves | UOP Chemical |
| 1,4-butanediol | Aldrich Chemical |
| Ethacure 300 | Dimethyltho toluene diamine, eq. wt 107, Albemarle Chemical |
| Ethacure 100 | Diethyl toluene diamine eq wt. 89, Albemarle Chemical |
| PEP-550 | Pentaerythritol initiated tetrol, eq. wt. 125, BASF |
| Pluracol 355 | Amine base tetrol, eq. wt. 125, BASF |
| Polylink 4004 | N,N'-Di-sec-butyl-p-phenylene diamine, eq. wt. 110, Hanson Group |
| TP-440 | Propoxylated trimethylol propane, eq. wt. 140, BASF |
| Crystal Dabco | Triethylenediamine, Air Products |
| DBU | 1,8-Diazabicyclo(5.4.0)undec-7-ene, Air Products |
| Piperazine | Aldrich Chemical |

Example 1

Comparative

The formulations set forth in Table 1 are comparative. These formulations demonstrate methods first to create a typical commercial product with two Tg's and high storage modulus or stiffness at −35° C., and then to eliminate the higher temperature Tg and lower the −35° C. storage modulus without a desirable improvement in 85° C. storage modulus (formulas 7526-20A/B). Formulas 96A/B, 111A/B, 110A/110B and 109A/B systematically reduce the isocyanate content of the prepolymer and results in positive incremental reductions in the −35° C. modulus, unfortunately with the trade off of reduced tensile strength and without significant improvements to the 85° C. modulus. The remaining formula alterations are required to balance the formula to maintain a whole number mix ratio by volume and an index in the range of 121%.

Note that in Table 1 and all the other tables in the examples the number designations ending in "A" are the Part A prepolymer component and the number designations ending in "B" are the Part B curative component of the formulations. Also note that TEDA is triethylene diamine (Crystal Dabco from Air Products and Chemicals Inc., Allentown, Pa., U.S.A.)

TABLE 1

| | 7526-20A | 7526-96A | 7526-111A | 7526-110A | 7526-109A |
|---|---|---|---|---|---|
| GP6515 | 24 | 38 | 47 | 52.8 | 58.3 |
| MRS-4 | 54 | 25.9 | 18.9 | 14.4 | 10 |
| ML | 6 | 7.5 | 5.5 | 4.2 | 3.1 |
| RCS Talc | 15 | 27.7 | 27.7 | 27.7 | 27.7 |
| 5A Sieves | 1 | 0.85 | 0.85 | 0.85 | 0.85 |
| % NCO | 19.9 | 9 | 7 | 5 | 3 |

| | 7526-20B | 7526-96B | 7526-111B | 7526-110B | 7526-109B |
|---|---|---|---|---|---|
| GP6515 | 54.2 | 48.5 | 51.4 | 53.1 | 54.7 |
| 1,4-Butanediol | 15 | 6.8 | 3.9 | 2.2 | 0.56 |
| RCS Talc | 30 | 44 | 44 | 44 | 44 |
| TEDA | 0.07 | 0.07 | 0.07 | 0.07 | 0.07 |
| No. Tg's | 2 | 1 | 1 | 1 | 1 |
| Tg, (C.) | −57, 37 | −50 | −51 | −52 | −54 |
| Storage Modulus at −35 C., (Mpa) | 2200 | 1379 | 506 | 127 | 39 |
| Storage Modulus at 85 C., (Mpa) | 25 | 35 | 19 | 17.5 | 10.6 |
| Tensile, (Mpa) | 16.2 | 7.9 | 4.7 | 3.3 | 2.8 |
| Young's Modulus, (Mpa) | 190 | 55.6 | 16.2 | 11.7 | 8.3 |
| Elongation, (%) | 134 | 113 | 203 | 57 | 185 |

Example 2

In an evaluation of raising the storage modulus at 85° C. several different approaches were evaluated with the formulas set forth in Table 2 using practical structure property approaches known to those familiar with the art while holding the percent isocyanate and filler constant. All formulas in this example share the same prepolymer prepared from a 5,000 molecular weight polyol and an isocyanate content of 9 percent. Formula 51A/B represents a standard single Tg system demonstrating a desirable low modulus at −35° C. but an undesirably low modulus at 85° C. and is the repeated reference point in this disclosure. Formula 51A/85B adds 20 percent of PEP-550 a tetra functional polyol to the curative which generates a large increase in −35° C. modulus but little desired increase at 85° C. Formula 51A/86B adds 20 percent of Pluracol 355 a tetra functional amine initiated polyol to the curative with a similar negative effect i.e. an increase in −35° C. modulus but no significant increase at 85° C. Formula 51A/88B adds 15 percent of a hindered aromatic amine dimethylthio toluene diamine ("DMTDA") to the curative that also resulted in an increase in −35° C. modulus and an increase from about 16 to about 26 in 85° C. modulus.

TABLE 2

|  | 7526-51A | 7526-51A | 7526-51A | 7526-51A |
|---|---|---|---|---|
| GP5171 | 52.5 | 52.5 | 52.5 | 52.5 |
| MRS-4 | 22 | 22 | 22 | 22 |
| ML | 9.5 | 9.5 | 9.5 | 9.5 |
| RCS Talc | 15 | 15 | 15 | 15 |
| 5A Sieves | 1 | 1 | 1 | 1 |
| % NCO | 9 | 9 | 9 | 9 |

|  | 7526-51B | 7526-85B | 7526-86B | 7526-88B |
|---|---|---|---|---|
| GP5171 | 63.6 | 50.35 | 50.35 | 54.65 |
| 1,4-Butanediol | 6.75 | 0 | 0 | 0.7 |
| RCS Talc | 29.6 | 29.6 | 29.6 | 29.6 |
| TEDA | 0.05 | 0.05 | 0.05 | 0.05 |
| Pluracol-355 | 0 | 0 | 20 | 0 |
| Ethacure 300 | 0 | 0 | 0 | 15 |
| PEP-550 | 0 | 20 | 0 | 0 |
| No. Tg's | 1 | 1 | 1 | 1 |
| Tg, (C.) | −43 | −39 | −40 | −48 |
| Storage Modulus at −35 C., (Mpa) | 230 | 1640 | 1452 | 601 |
| Storage Modulus at 85 C., (Mpa) | 15.8 | 18.7 | 18.5 | 25.9 |
| Tensile, (Mpa) | 3.2 | 10 | 3.3 | 11.2 |
| Young's Modulus, (Mpa) | 8.8 | 11.7 | 13 | 19.7 |
| Elongation, (%) | 55 | 33 | 30 | 308 |

Example 3

In the formulas set forth in Table 3 the molecular weight is incrementally increased while holding the percent isocyanate and filler constant. Formula 52A/B is prepared from 3,000 molecular weight polyol, 51A/B from 5,000 molecular weight polyol, 27A/B from 6,000 molecular weight polyol and 55A/B from a blend of 9,000 molecular weight polyol in the prepolymer and 6,000 molecular weight polyol in the curative. The date in Table 3 demonstrates a lack of appreciable change in either 85° C. modulus, tensile strength or Young's modulus as the molecular weight varies. There is however a trend for elongation to increase as the polyol molecular weight increase to 6,000 and above.

TABLE 3

|  | 7526-52A | 7526-51A | 7526-27A | 7526-55A |
|---|---|---|---|---|
| GP5171 | 0 | 52.5 | 0 | 0 |
| L330-18 | 0 | 0 | 0 | 54 |
| GP3510 | 51 | 0 | 0 | 0 |
| GP6515 | 0 | 0 | 54 | 0 |
| MRS-4 | 22.7 | 22 | 25 | 24 |
| ML | 10.2 | 9.5 | 6 | 6 |
| RCS Talc | 15 | 15 | 15 | 15 |
| 5A Sieves | 1 | 1 | 1 | 1 |
| % NCO | 9 | 9 | 9 | 9 |

|  | 7526-52B | 7526-51B | 7526-27B | 7526-55B |
|---|---|---|---|---|
| GP5171 | 0 | 63.6 | 0 | 0 |
| GP3510 | 64 | 0 | 0 | 0 |
| GP6515 | 0 | 0 | 63.7 | 62.9 |
| 1,4-Butanediol | 6 | 6.75 | 5.4 | 6.2 |
| RCS Talc | 30 | 30 | 30 | 30 |
| TEDA | 0.06 | 0.06 | 0.07 | 0.07 |
| No. Tg's | 1 | 1 | 1 | 1 |
| Tg, (C.) | −37 | −43 | −53 | −53 |
| Storage Modulus at −35 C., (Mpa) | 2800 | 230 | 150 | 100 |

TABLE 3-continued

| Storage Modulus at 85 C., (Mpa) | 15 | 15.8 | 11.8 | 10 |
|---|---|---|---|---|
| Tensile, (Mpa) | 3 | 3.2 | 3.8 | 4.2 |
| Young's Modulus, (Mpa) | 7.3 | 8.8 | 5.2 | 6.7 |
| Elongation, (%) | 65 | 55 | 121 | 162 |

Example 4

The formulas set forth in Table 4 assess the relationship between variations in the filler content. Removing the filler altogether in formula 97A/B relative to the reference formula 51A/B at 20 weight percent overall does not change the −35° C. modulus but drops the 85° C. modulus by more than half from 15.8 to 6.5 MPa. Increasing the filler to 31 weight percent overall in formula 101A/B creates an undesirable large increase in −35° C. modulus from 230 MPa for 51A/B to 3,359 MPa. The 85° C. storage modulus trends higher with filler from 6.5 MPa with no filler to 36 MPa with 31 percent filler. Tensile strength and Young's modulus also trend higher with filler content although the rate of change is relatively low. There was no change in elongation as the filler was increased.

TABLE 4

|  | 7526-97A | 7526-51A | 7526-101A |
|---|---|---|---|
| GP5171 | 52.5 | 52.5 | 43.2 |
| MRS-4 | 22 | 22 | 21.5 |
| ML | 9.5 | 9.5 | 9.2 |
| RCS Talc | 0 | 15 | 25 |
| 5A Sieves | 0 | 1 | 1 |
| % NCO | 9 | 9 | 9 |

|  | 7526-97B | 7526-51B | 7626-101B |
|---|---|---|---|
| GP5171 | 63.3 | 63.6 | 49.15 |
| 1,4-Butanediol | 7.7 | 6.75 | 6.8 |
| RCS Talc | 0 | 29.6 | 44 |
| TEDA | 0.05 | 0.05 | 0.05 |
| Overall Filler Content | 0 | 20 | 31 |
| No. Tg's | 1 | 1 | 1 |
| Tg, (C.) | −42 | −43 | −38 |
| Storage Modulus at −35 C., (Mpa) | 220 | 230 | 3359 |
| Storage Modulus at 85 C., (Mpa) | 6.5 | 15.8 | 36 |
| Tensile, (Mpa) | 1.5 | 3.2 | 5.8 |
| Young's Modulus, (Mpa) | 0.4 | 8.8 | 28.6 |
| Elongation, (%) | 45 | 55 | 50 |

Example 5

The formulas set forth in Table 5 assess the effect of incrementally increasing the concentration of DMTDA while holding the molecular weight and isocyanate constant at 5,000 and 9 weight percent respectively. There was no appreciable change in −35° C. or 85° C. storage modulus or Young's modulus as the DMTDA concentration was increased from 9, 15 and 18 weight percent in the Part B curative component. There was a slight trend up in both tensile strength and percent elongation with increasing DMTDA concentration from 4.9 to 6.7 MPa and from 115 to 167 percent respectively.

TABLE 5

|  | 7526-140A | 7526-140A | 7526-140A |
|---|---|---|---|
| GP5171 | 64 | 64 | 64 |
| MRS-4 | 14 | 14 | 14 |

TABLE 5-continued

| | | | |
|---|---|---|---|
| ML | 6 | 6 | 6 |
| RCS Talc | 15 | 15 | 15 |
| 5A Sieves | 1 | 1 | 1 |
| % NCO | 5 | 5 | 5 |

| | 7526-155B | 7526-112B | 7526-113B |
|---|---|---|---|
| GP5171 | 58.6 | 54.8 | 52.4 |
| 1,4-Butanediol | 3 | 0.51 | 0 |
| RCS Talc | 29.3 | 29.6 | 29.6 |
| TEDA | 0.05 | 0.05 | 0.05 |
| Ethacure 300 | 9 | 15 | 18 |
| No. Tg's | 1 | 1 | 1 |
| Tg, (C.) | −47 | −48 | −50 |
| Storage Modulus at −35 C., (Mpa) | 212 | 176 | 201 |
| Storage Modulus at 85 C., (Mpa) | 21 | 17.8 | 20 |
| Tensile, (Mpa) | 4.9 | 6 | 6.7 |
| Young's Modulus, (Mpa) | 14.4 | 1.3 | 15 |
| Elongation, (%) | 115 | 167 | 186 |

Example 6

The formulas set forth in Table 6 assess the effect of using less sterically hindered aromatic amines. Formula 8A/10B replaces a portion of DMTDA with diethyl toluenediamine ("DETA") and resulted in a formula that reacted so fast it was impractical to use it as a two-part adhesive and could not be cast into plaques. Formula 6A/B replaced the DMTDA with N,N'-Di-sec-butyl-p-phenylene diamine and resulted in a soft product with both low −35° C. and 85° C. storage modulus and a high elongation at 400 percent.

TABLE 6

| | 7815-8A | 7815-6A |
|---|---|---|
| L330-18 | 60.6 | 63.6 |
| MRS-4 | 18.6 | 16.2 |
| ML | 4.8 | 4.2 |
| RCS Talc | 15 | 15 |
| 5A Sieves | 1 | 1 |
| % NCO | 6.8 | 5.8 |

| | 7815-10B | 7815-6B |
|---|---|---|
| GP6515 | 49.79 | 51.6 |
| 1,4-Butanediol | 0.1 | 0.2 |
| RCS Talc | 30 | 30 |
| TEDA | 0.01 | 0.04 |
| Ethacure 300 | 2.9 | 0 |
| Ethacure 100 | 16.1 | 0 |
| Polylink 4004 | 0 | 17 |
| Piperazine | 1.1 | 1.1 |
| No. Tg's | | 1 |
| Tg, (C.) | Too Fast | −54 |
| Storage Modulus at −35 C., (Mpa) | | 112 |
| Storage Modulus at 85 C., (Mpa) | | 11.7 |
| Tensile, (Mpa) | | 8 |
| Young's Modulus, (Mpa) | | 8.4 |
| Elongation, (%) | | 400 |

Example 7

Figure 1:
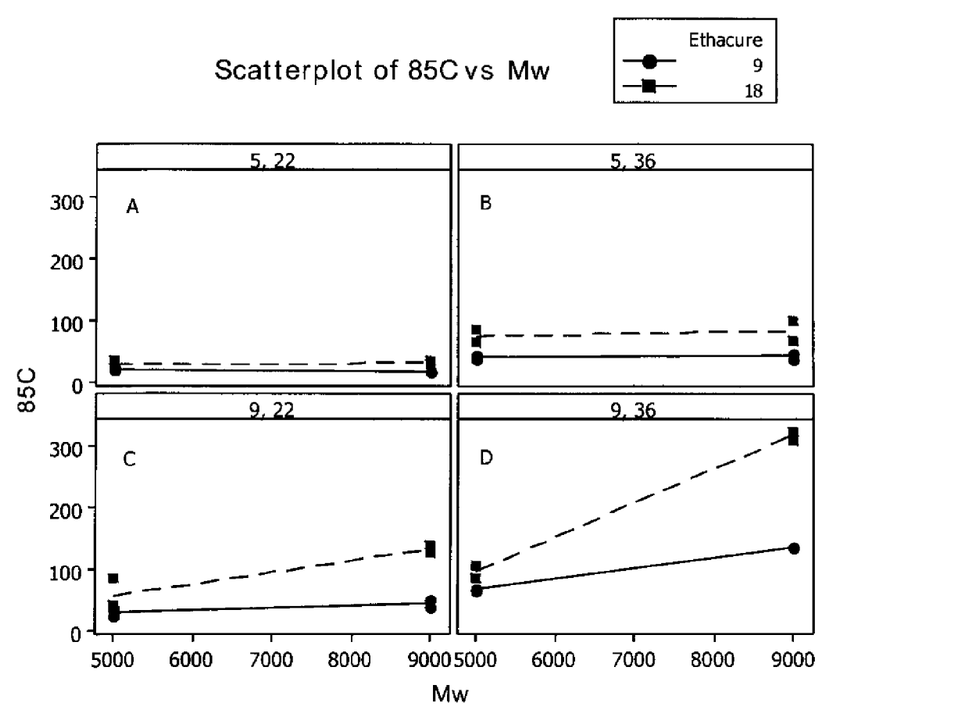
FIG. 1 is a scatter plot of 85° C. storage modulus versus polyol molecular weight for a polyurea-urethane adhesive composition in accordance with the invention.

With the goal of creating a polyurethane adhesive that combines characteristic advantages of good strength, low sag, high tensile strength and Young's modulus, adhesion and fast cure with a single Tg product that has improved stiffness at elevated temperature the following statistically designed experiment was applied to formulations in accordance with the invention. The design is a $2^5$ full factorial with center points evaluating five different variables each at two levels and shown in Table 7. The four variables are polyol molecular weight 5,000; or a mixture using 9,000 molecular weight in the prepolymer and 6,000 molecular weight in the curative, filler content of either 22 or 36 weight percent, DMTDA content of either 9 or 18 percent and prepolymer isocyanate content of either 5 or 9 percent. Each formula in the design was evaluated at two different A:B ratios to evaluate the isocyanate to hydroxyl index as a fifth variable. The design data were evaluated by fitting all variables using MINITAB™ statistical software and the traditional rules for excluding variables based on "P" value, (where values less than 0.05 are statically significant) shown in Table 8. The primary data fit used storage modulus at 85° C. as the response and the index variable was quickly eliminated as insignificant as were any four or five way interactions. The remaining model is shown in Table 8. The factorial fit clearly confirms the four remaining variables are significant as well as six 2-way interactions. The unexpected and surprising results confirm the presence of three 3-way interactions between molecular weight, isocyanate content and DMTDA, molecular weight, isocyanate content and percent filler and finally molecular weight, DMTDA and percent filler. Graphically the results are shown in FIG. 1.

TABLE 7

| | 1 | 2 | 3 | 4 | 5 | 6 | 7 | 8 | 9 |
|---|---|---|---|---|---|---|---|---|---|
| ID | 139A | 140A | 141A | 142A | 141A | 142A | 145A | 139A | 147A |
| GP5171 | 52.5 | 63.9 | 0 | 0 | 0 | 0 | 0 | 52.5 | 52 |
| L330-18 | 0 | 0 | 54.2 | 53.6 | 54.2 | 53.6 | 0 | 0 | 0 |
| GP6515 | 0 | 0 | 0 | 0 | 0 | 0 | 48.6 | 0 | 0 |
| MRS-4 | 22 | 14 | 23.7 | 13.9 | 23.7 | 13.9 | 17.1 | 22 | 13.4 |
| ML | 9.5 | 6.1 | 6.1 | 3.7 | 6.1 | 3.7 | 7.3 | 9.5 | 5.8 |
| RCS Talc | 15 | 15 | 15 | 27.8 | 15 | 27.8 | 26 | 15 | 27.8 |
| 5A Sieves | 1 | 1 | 1 | 1 | 1 | 1 | 1 | 1 | 1 |
| % NCO | 9 | 5 | 9 | 5 | 9 | 5 | 7 | 9 | 5 |
| ID | 139B | 140B | 141B | 142B | 143B | 144B | 145B | 146B | 147B |
| GP5171 | 45.6 | 52.3 | 0 | 0 | 0 | 0 | 0 | 59 | 43.5 |
| GP6515 | 0 | 0 | 58.6 | 43.6 | 45.6 | 37.4 | 48.6 | 0 | 0 |
| 1,4-Butanediol | 6.7 | 0.25 | 2.3 | 3.1 | 6.3 | 0.3 | 5.8 | 2.3 | 3.2 |
| Talc | 29.6 | 29.4 | 30 | 44 | 30 | 44 | 32 | 29.6 | 44.2 |
| Ethacure 300 | 18 | 18 | 9 | 9 | 18 | 18 | 13.5 | 9 | 9 |

TABLE 7-continued

| | | | | | | | | | |
|---|---|---|---|---|---|---|---|---|---|
| TEDA | 0.07 | 0.07 | 0.07 | 0.07 | 0.07 | 0.07 | 0.07 | 0.07 | 0.07 |
| No. Tg's | 1 | 1 | 1 | 1 | 1 | 1 | 1 | 1 | 1 |
| Tg, (C.) | −48 | −49 | −53 | −53 | −54 | −56 | −52 | −46 | −47 |
| Storage Modulus at −35 C., (MPa) | 3317 | 441 | 379 | 312 | 1054 | 497 | 966 | 928 | 747 |
| Storage Modulus at 85 C., (MPa) | 42 | 34 | 50 | 48 | 139 | 68 | 62 | 35 | 39 |

| | 10 | 11 | 12 | 13 | 14 | 15 | 16 | 17 |
|---|---|---|---|---|---|---|---|---|
| ID | 147A | 149A | 150A | 151A | 151A | 149A | 150A | 140A |
| GP5171 | 52 | 0 | 40.7 | 0 | 0 | 0 | 40.7 | 63.9 |
| L330-18 | 0 | 65.9 | 0 | 42 | 42 | 65.9 | 0 | 0 |
| GP6515 | 0 | 0 | 0 | 0 | 0 | 0 | 0 | 0 |
| MRS-4 | 13.4 | 14.4 | 21.5 | 23 | 23 | 14.4 | 21.5 | 14 |
| ML | 5.8 | 3.7 | 9 | 6.2 | 6.2 | 3.7 | 9 | 6.1 |
| RCS Talc | 27.8 | 15 | 27.8 | 27.8 | 27.8 | 15 | 27.8 | 15 |
| 5A Sieves | 1 | 1 | 1 | 1 | 1 | 1 | 1 | 1 |
| % NCO | 5 | 5 | 9 | 9 | 9 | 5 | 9 | 5 |

| ID | 148B | 149B | 150B | 151B | 152B | 153B | 154B | 155B |
|---|---|---|---|---|---|---|---|---|
| GP5171 | 37.4 | 0 | 44.2 | 0 | 0 | 0 | 31 | 58.6 |
| GP6515 | 0 | 51.8 | 0 | 31.3 | 44.2 | 58 | 0 | 0 |
| 1,4-Butanediol | 0.4 | 0.1 | 2.5 | 6.4 | 2.5 | 2.9 | 6.8 | 3 |
| Talc | 44.2 | 30 | 44.2 | 44.2 | 44.2 | 30 | 44.2 | 29.4 |
| Ethacure 300 | 18 | 18 | 9 | 18 | 9 | 9 | 18 | 9 |
| TEDA | 0.07 | 0.07 | 0.07 | 0.07 | 0.07 | 0.07 | 0.07 | 0.07 |
| No. Tg's | 1 | 1 | 1 | 1 | 1 | 1 | 1 | 1 |
| Tg, (C.) | −50 | −55 | −47 | −54 | −54 | −54 | −54 | −48 |
| Storage Modulus at −35 C., (MPa) | 1374 | 153 | 2504 | 2610 | 1133 | 81 | 8003 | 204 |
| Storage Modulus at 85 C., (MPa) | 84 | 34 | 66 | 326 | 137 | 18 | 107 | 22 |

TABLE 8

Factorial Fit: 85° C. versus Mw, NCO, ETHACURE ®, % Filler
Estimated Effects and Coefficients for 85 C (coded units)

| Term | Effect | Coef | SE Coef | T | P |
|---|---|---|---|---|---|
| Constant | | 76.618 | 2.519 | 30.42 | 0.000 |
| Mw | 49.139 | 24.569 | 2.519 | 9.76 | 0.000 |
| NCO | 67.611 | 33.806 | 2.519 | 13.42 | 0.000 |
| Ethacure | 52.611 | 26.306 | 2.519 | 10.44 | 0.000 |
| % Filler | 62.389 | 31.194 | 2.519 | 12.39 | 0.000 |
| Mw*NCO | 46.264 | 23.132 | 2.519 | 9.18 | 0.000 |
| MW*Ethacure | 28.514 | 14.257 | 2.519 | 5.66 | 0.000 |
| MW* % Filler | 26.486 | 13.243 | 2.519 | 5.26 | 0.000 |
| NCO*Ethacure | 29.236 | 14.618 | 2.519 | 5.80 | 0.000 |
| NCO* % Filler | 26.264 | 13.132 | 2.519 | 5.21 | 0.000 |
| Ethacure* % Filler | 18.514 | 9.257 | 2.519 | 3.68 | 0.002 |
| Mw*NCO*Ethacure | 24.889 | 12.444 | 2.519 | 4.94 | 0.000 |
| Mw*NCO* % Filler | 23.611 | 11.806 | 2.519 | 4.69 | 0.000 |
| Mw*Ethacure* % Filler | 11.611 | 5.806 | 2.519 | 2.31 | 0.033 |

S = 14.4043
PRESS = 10978.7
R-Sq = 97.66%
R-Sq(pred) = 93.48%
R-Sq(adj) = 96.06%

The A graph in the upper left of FIG. 1 shows the result of high and low DMTDA with 5 percent isocyanate and 22 percent filler on the 85° C. storage modulus. Moving from low to high DMTA there is very little change in 85° C. storage modulus when the polyol molecular weight is increased from 5,000 to 9,000. The B graph in the upper right of FIG. 1 is similar but increases the filler content from 22 to 36 weight percent and shows a slight increase in high temperature modulus as DMTDA moves from low to high concentration without changing as the molecular weight increases from 5,000 to 9,000. The C graph in the lower left of FIG. 1 increases the isocyanate content from 5 to 9 weight percent at 22 percent filler relative to graph A. As the DMTDA is increased from low to high concentration a significant increase in 85° C. storage modulus is observed when the molecular weight is moved from low to high teaching the interdependence of 85° C. storage modulus on DMTDA content and molecular weight and when compared to graph A it further teaches the added dependence on isocyanate content. The D graph in the lower right of FIG. 1 is similar to C but raises the filler level to 36 weight percent. As DMTDA is increased from low to high both levels now show dependence on molecular weight increasing as the molecular weight moves from 5,000 to 9,000 further showing the interdependence of 85° C. modulus on DMTDA, molecular weight and filler content. Comparing the high or low DMTDA lines respectively on graphs A and D or B and C demonstrates the interdependence of molecular weight, isocyanate content and filler content. The overall result of the $2^5$ fractional factorial demonstrates three 3-way interactions of the invention which methods optimize the storage modulus at 85° C. through the combined use of high molecular weight polyol, high DMTDA concentration, high isocyanate content and high filler concentration provided that the isocyanate content is kept low enough to eliminate high temperature Tg, i.e. a composition having dual Tg.

Example 8

Formulations based on the results of Table 7 are set forth in Table 9 which demonstrates the range of performance from within the formulation as additional components are included for functionality and enhanced application. Formula 151A/81B formulated at 33 percent filler, 9 percent isocyanate, 18 percent DMTDA adds piperazine as a sag mitigation additive;

formula 151A 82B is similar but reduces the DMTDA to 9 percent. Both formulations demonstrate less than 5.5 mm of sag when drawn out in a 13 mm bead. The 85° C. storage modulus is 326 MPa with 18 percent DMTDA and drops to 137 MPa when the DMTDA is reduced to 9 percent demonstrating the ease of manipulating the high temperature stiffness. Formula 178A/B reduces the isocyanate content to 6.1 percent, filler to 21 percent, DMTDA to 17.5 percent and adds R972 fumed silica to both curative and prepolymer, triethylenediamine and 1,8-diazabicyclo(5.4.0)undec-7-ene catalyst to the curative to produce a non-sagging system with an 85° C. and −35° C. storage modulus of 73 and 328 MPa respectively. Formula 114A/104B is formulated with 7 percent isocyanate, 18 percent DMTDA, 20 percent filler and adds both R972 fumed silica, piperazine as well as triethylenediamine and 1,8-diazabicyclo(5.4.0)undec-7-ene catalyst to the curative to produce a non sagging adhesive with 85° C. and −35° C. storage modulus of 50 and 246 MPa respectively. Formula 174A/185B further reduces the isocyanate content to 5.8 percent, DMTDA to 17 percent with 20 percent filler but adds piperazine and triethylenediamine to the curative. These alterations produce a system with 85° C. and −35° C. storage modulus of 40 and 182 MPa respectively.

TABLE 9

|  | 151A | 151A | 178A | 114A | 174A |
|---|---|---|---|---|---|
| L330-18 | 42 | 42 | 57.46 | 60.2 | 63.6 |
| MRS-4 | 23 | 23 | 16.8 | 19 | 16.2 |
| ML | 6.2 | 6.2 | 4.2 | 4.8 | 4.2 |
| R972 | 0 | 0 | 3.5 | 0.5 | 0 |
| RCS Talc | 27.8 | 27.8 | 17 | 15 | 15 |
| 5A Sieves | 1 | 1 | 1 | 1 | 1 |
| % NCO | 9 | 9 | 6.1 | 7 | 5.8 |

|  | 81B | 82B | 178B | 104B | 185B |
|---|---|---|---|---|---|
| GP6515 | 31.3 | 44.2 | 48.2 | 47.9 | 50.75 |
| 1,4-Butanediol | 6.4 | 2.5 | 0.95 | 1.3 | 0.9 |
| Talc | 43.3 | 44.2 | 29 | 30 | 30 |
| Ethacure 300 | 18 | 9 | 17.5 | 18 | 17 |
| R972 | 0 | 0 | 3.5 | 1 | 0 |
| Piperazine | 0.95 | 0.95 | 0 | 1.1 | 1.1 |
| TEDA | 0.1 | 0.1 | 0.05 | 0.04 | 0.05 |
| DBU | 0 | 0 | 0.8 | 0.8 | 0 |
| No. Tg's | 1 | 1 | 1 | 1 | 1 |
| Tg, (C.) | −54 | −54 | −58 | −57 | −54 |
| Storage Modulus at −35 C., (Mpa) | 2610 | 1133 | 328 | 246 | 182 |
| Storage Modulus at 85 C., (Mpa) | 326 | 137 | 73 | 50 | 40 |
| Tensile, (Mpa) | 13.8 | 10.3 | 11.3 | 10.4 | 11.0 |
| Young's Modulus, (Mpa) | 581.9 | 232.3 | 61.8 | 49.6 | 26.7 |
| Elongation, (%) | 58 | 93 | 190 | 276 | 296 |

Example 9

Polyurea-urethane adhesive compositions 114A/104B and 174A/185B (Table 9) were applied as adhesive systems over epoxy based carbon graphite fiber composite relative to a common automotive specification. Lap shear data for these constructed parts is set forth in Table 10. All three tested samples experienced cohesive failure. The data demonstrate both the ability of the adhesive to exceed the minimum requirements and maintain considerable strength at elevated temperatures.

TABLE 10

|  | −30 C. | 25 C. | 60 C. | 80 C. |
|---|---|---|---|---|
| 114A/104B, Mpa | 16.7 | 9.2 | 7.8 | 5.8 |
| 174A/185B, Mpa | 11.9 | 6.5 | 5.3 | 4.1 |
| Typical Specification, Mpa | 3.4 | 3.4 | 3.4 | 1.4 |

I claim:
1. A two-part polyurea-urethane adhesive composition comprising
   a) a Part A prepolymer component having an isocyanate content of about 82 equivalent percent to about 95 equivalent percent comprising
      i. an isocyanate component comprising polymeric isocyanate and having an oligomer content greater than 15 weight percent by weight of the isocyanate component;
      ii. polyol having a molecular weight of about 5,000 to about 12,000; and
      iii. about 20 percent to about 44 percent weight percent filler by weight of the composition
   b) a Part B curative component comprising
      i. polyol having molecular weight of about 70 to about 12,000;
      ii. at least one sterically hindered aromatic diamine;
      iii. about 20 percent to about 44 percent filler by weight of the composition; and
      iv. at least one catalyst
wherein the adhesive has an 85° C. storage modulus greater than about 20 MPa.

2. The two-part polyurea-urethane adhesive composition of claim 1 wherein the aromatic diamine is selected from the group consisting of 4,4' methylene-bis-3-(chloro-2,6-diethylbenzenamine); methylene-bis-ortho-chloroaniline; 4,4'-methylene-bis-(2-chloro-6-ethylaniline); 1,2-bis(2-aminophenylthio)ethane and dimethylthiotoluenediamine.

3. The two-part polyurea-urethane adhesive composition of claim 1 wherein the polyol of the Part A prepolymer component is a polyether polyol polymerized from ethylene oxide, propylene oxide, butylene oxide, tetrahydrofuran, styrene oxide, epichlorohydrin and combinations thereof.

4. The two-part polyurea-urethane adhesive composition of claim 3 wherein the polyether polyol has a functionality of about 2 to about 4.

5. The two-part polyurea-urethane adhesive composition of claim 1 wherein the polymeric isocyanate comprises polymeric methylene diphenyl diisocyanate having a functionality from about 2 to about 10.

6. The two-part polyurea-urethane adhesive composition of claim 1 wherein the isocyanate component further comprises monomeric isocyanate.

7. The two-part polyurea-urethane adhesive composition of claim 1 wherein the filler of the Part A prepolymer component comprises fumed silica.

8. The two-part polyurea-urethane adhesive composition of claim 1 wherein the filler of the Part A prepolymer component, Part B curative component or both the Part A prepolymer component and the Part B curative component comprises molecular sieves having a pore size of about 3 to about 5 angstroms.

9. The two-part polyurea-urethane adhesive composition of claim 1 wherein the polyol of the Part B curative component is a polyether polyol polymerized from ethylene oxide, propylene oxide, butylene oxide, tetrahydrofuran, styrene oxide, epichlorohydrin and combinations thereof.

10. The two-part polyurea-urethane adhesive composition of claim 9 wherein the polyether polyol has a functionality of about 2 to about 5.

11. The two-part polyurea-urethane adhesive composition of claim 1 wherein the Part B curative component comprises up to about 30 equivalent percent polyol.

12. The two-part polyurea-urethane adhesive composition of claim 1 wherein the catalyst is selected from the group consisting of triethylamine, benzyldimethylamine, triethylenediamine, tetramethylbutanediamine, diazobicycloundecene, stannous acetate, stannous octoate, stannous laurate, stannous oleate, dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate, trialyltin hydroxide, dialkyltin oxide, dibutytin disulfide, dibutyl tin diisooctylmaleate, dibutyltin dilauryl mercaptide, dibutyltin di(isooctylmercaptoacetate), zinc neodecanate, iron acetylacetonate, and combinations thereof.

13. The two-part polyurea-urethane adhesive composition of claim 1 wherein the Part B curative component further comprises a thixotropy creating amine having primary amine groups, secondary amine groups or combinations of primary and secondary amine groups wherein the thixotropy creating amine is not sterically hindered.

14. The two-part polyurea-urethane adhesive composition of claim 1 wherein the filler of the Part A prepolymer component or the filler of the Part B curative component is selected from the group consisting of talc, mica, kaolin, bentone clay, aluminum oxides, titanium oxides, iron oxides, barium sulfate, hornblends, amphibiles, chrysotile, carbon black, carbon fibers, fumed silica, molecular sieves and combinations thereof.

15. The two-part polyurea-urethane adhesive composition of claim 1 wherein the weight ratio of the Part A prepolymer component to Part B curative component is about 1.25:1 to about 2.50:1.

16. A composition of matter comprising at least two substrates each having at least one surface and the two-part polyurea-urethane adhesive composition of claim 1.

17. The composition of matter of claim 16 wherein the substrates comprise unsaturated polyester resin, vinyl ester resin, epoxy resin, metal, polypropylene, thermoplastic olefins, nylon, acrylonitrile-butadiene styrene and combinations thereof.

18. The composition of matter of claim 16 wherein at least one of the substrates is a carbon graphite composite.

19. A two-part polyurea-urethane adhesive composition comprising
   a) a Part A prepolymer component having an isocyanate content of about 82 equivalent percent to about 95 equivalent percent comprising
      i. an isocyanate component comprising polymeric isocyanate and having an oligomer content greater than 15 weight percent by weight of the isocyanate component;
      ii. polyol having a molecular weight of about 5,000 to about 12,000; and
      iii. about 20 percent to about 44 percent filler by weight of the composition
   b) a Part B curative component comprising
      i. a low molecular weight hydroxyl compound having a functionality of about 2 and a molecular weight from about 32 to about 600 and a high molecular weight hydroxyl compound having a functionality of about 2 to 5 and a molecular weight of about 5,000 to about 18,0001
      ii. at least one aromatic amine;
      iii. about 20 percent to about 44 percent filler by weight of the composition; and
      iv. at least one catalyst
wherein the adhesive has an 85° C. storage modulus greater than about 20 MPa.

20. A process for bonding at least two substrates comprising the steps of providing a first substrate with at least one surface, providing a second substrate with at least one surface, providing the two-part polyurea-urethane adhesive composition of claim 1, applying the two-part polyurea-urethane adhesive composition to a surface of the first substrate, second substrate or both the first and second substrate, aligning the first substrate and second substrate so that a surface of one of the substrates having the two-part polyurea-urethane adhesive composition is juxtaposed and in contact with a surface of the other substrate, and curing the two-part polyurea-urethane adhesive composition.

21. The process of claim 20 wherein the substrates comprise unsaturated polyester resin, vinyl ester resin, epoxy resin, metal, polypropylene, thermoplastic olefins, nylon, acrylonitrile-butadiene styrene and combinations thereof.

22. The process of claim 20 wherein at least one of the substrates is a carbon graphite composite.

23. The process of claim 20 wherein the two-part polyurea-urethane adhesive composition is applied with a static mixer.

24. The process of claim 20 wherein the surfaces are not treated prior to application of the two-part polyurea-urethane adhesive composition.

* * * * *